(12) United States Patent
Goslawski et al.

(10) Patent No.: US 11,111,957 B1
(45) Date of Patent: Sep. 7, 2021

(54) WEAR PAD

(71) Applicants: ZOOMLION Heavy Industry NA, Inc., Yorkville, WI (US); ZOOMLION Heavy Industry Science and Technology Co. Ltd., Changsha Hunan Province (CN)

(72) Inventors: Erik Goslawski, Burlington, WI (US); Edgar Calago, Lake Villa, IL (US)

(73) Assignees: ZOOMLION HEAVY INDUSTRY NA, INC., Yorkville, WI (US); ZOOMLION HEAVY INDUSTRY SCIENCE AND TECHNOLOGY CO. LTD, Changsha Hunan Province (CN)

( * ) Notice: Subject to any disclaimer, the term of this patent is extended or adjusted under 35 U.S.C. 154(b) by 0 days.

(21) Appl. No.: 16/935,328

(22) Filed: Jul. 22, 2020

(51) Int. Cl.
*F16C 29/02* (2006.01)
*F16C 33/04* (2006.01)
*F16C 29/12* (2006.01)
*F16C 29/00* (2006.01)
*B66C 23/70* (2006.01)

(52) U.S. Cl.
CPC ............ *F16C 29/02* (2013.01); *F16C 29/001* (2013.01); *F16C 29/126* (2013.01); *F16C 33/04* (2013.01); *B66C 23/707* (2013.01)

(58) Field of Classification Search
CPC ........ F16C 25/02; F16C 29/001; F16C 29/02; F16C 29/126; F16C 33/04; F16C 33/08; B66C 23/707
See application file for complete search history.

(56) References Cited

U.S. PATENT DOCUMENTS 2,491,384 A * 12/1949 MacMillin ............ B30B 15/041
384/39
3,719,403 A   3/1973 Sung
(Continued)

FOREIGN PATENT DOCUMENTS

CA   2529415   8/2006
FR   1105430   * 12/1955
(Continued)

OTHER PUBLICATIONS

Merriam-Webster, definition of "shim" obtained May 14, 2021.*
Rotaloc, Mold-in inserts-Hex, copyright 2014, Rotaloc Int'l, LLC.*

*Primary Examiner* — James Pilkington
(74) *Attorney, Agent, or Firm* — Donald. J. Ersler

(57) ABSTRACT

A shimless wear pad preferably includes a wear pad, an adjustment plate and at least one fastener. The wear pad includes a wear surface on a top and a wear tapered surface on a bottom. The wear pad includes at least one counter sunk cavity for retaining a threaded insert for threadably engaging the fastener. The adjustment plate includes an adjustment tapered surface on a top and a support surface on a bottom. An adjustment slot is formed through substantially all of a length of the adjustment plate. The adjustment slot provides clearance for the at least one fastener. The adjustment plate will be mounted between the wear pad and a stationary structure. The wear surface of the wear pad will make contact with a moving surface of a moving structure. The support surface of the adjustment plate makes contact with a retention surface of the stationary structure.

14 Claims, 2 Drawing Sheets

(56) References Cited

U.S. PATENT DOCUMENTS

| | | | | |
|---|---|---|---|---|
| 7,293,377 B2* | 11/2007 | Pinther, II | ............. | B66C 23/707 |
| | | | | 172/450 |
| 8,827,559 B2* | 9/2014 | Gentry | ................. | B66C 23/707 |
| | | | | 384/42 |
| 2006/0042131 A1 | 3/2006 | Pinther, II | | |

FOREIGN PATENT DOCUMENTS

| WO | WO 2008/130403 | 10/2008 |
|---|---|---|
| WO | WO 2014/191561 | 12/2014 |

\* cited by examiner

WEAR PAD

BACKGROUND OF THE INVENTION

1. Field of the Invention

The present invention relates generally to heavy equipment and more specifically to a wear pad, which includes a tapered adjustment plate that is slid relative to the wear pad to compensate for erosion of the wear pad.

2. Discussion of the Prior Art

A wear pad is used to minimize damage between two structural components as they move relative to each other. As the two structural components move relative to each other, the wear material thickness decreases and results in slop or play between the two structural components. It is common to use a shim to replace the worn thickness of a wear pad. A disadvantage of a shim is that it requires removal of hardware that retains the shim. Further, removal of the hardware is frequently located in a tight space. Finally, the procedure of replacing the hardware would have to be repeated multiple times for multiple wear pads. The time required to remove hardware results in down time of the equipment. U.S. Pat. No. 3,719,403 to Sung discloses a crane boom having wear pads. Patent publication no. 2006/0042131 to Pinther, I I et al. discloses a wear pad for an extendable linkage. Canadian Patent no. 2529415 to Brinkmann et al. discloses a self-adjusting slide block for telescopic crane jibs. Patent publication no. WO 2008/130403 to Pfaff et al. discloses a remotely adjustable wear pad for an extendable boom. Patent publication no. WO 2014/191561 to Fortunato et al. discloses an adjustable wear pad assembly for a telescopic boom.

Accordingly, there is a clearly felt need in the art for a wear pad, which eliminates the removal of hardware to adjust a worn wear pad by providing a tapered adjustment plate that is slid relative to the wear pad to compensate for erosion of the wear pad.

SUMMARY OF THE INVENTION

The present invention provides a wear pad, which includes a tapered adjustment plate that is slid relative to the wear pad to compensate for erosion of the wear pad. The wear pad preferably includes a wear pad, an adjustment plate and at least one fastener. The wear pad includes a wear surface on a top and a wear tapered surface on a bottom. The wear tapered surface is defined by an acute angle between the wear surface and the wear tapered surface. The wear pad includes at least one counter sunk cavity for retaining a threaded insert for threadably receiving the at least one fastener. An axis of the at least one insert is perpendicular to the wear surface of the wear pad. The adjustment plate includes an adjustment tapered surface on a top and a support surface on a bottom. The adjustment tapered surface forms an acute angle with the support surface. The acute angle of the wear tapered surface is equal to the acute angle of the adjustment tapered surface. An adjustment slot is formed through substantially all of a length of the adjustment plate. The length of the adjustment plate is preferably longer than a length of the wear pad. The adjustment slot provides clearance for the at least one fastener.

The adjustment plate will be mounted between the wear pad and a mounting or stationary structure. The wear surface of the wear pad will make contact with an interfacing or moving surface of a moving structure. The stationary structure could be an outer tube of a telescoping crane boom and the moving structure could be the inner tube of the telescoping crane boom. The support surface of the adjustment plate will make contact with a retention surface of the stationary structure. At least one hole is formed through the stationary structure to insert the at least one fastener. The at least one fastener is inserted through the at least one hole and threaded into the at least one threaded insert in the wear pad. When the wear tapered surface is in contact with the adjustment tapered surface, the support surface is parallel to the wear surface. The moving structure will erode the wear surface of the wear pad. The at least one fastener is loosened and an end of the adjustment plate is slide toward an end of the wear pad to raise the wear pad and compensate for the erosion of the wear surface by the moving surface. The at least one fastener is torqued, such that the adjustment plate does not move relative to the wear pad.

Accordingly, it is an object of the present invention to provide a wear pad, which eliminates the removal of hardware to adjust a worn wear pad by providing a tapered adjustment plate that is slid relative to the wear pad to compensate for wear on the wear pad.

These and additional objects, advantages, features and benefits of the present invention will become apparent from the following specification.

DETAILED DESCRIPTION OF THE PREFERRED EMBODIMENTS

Figure 1:
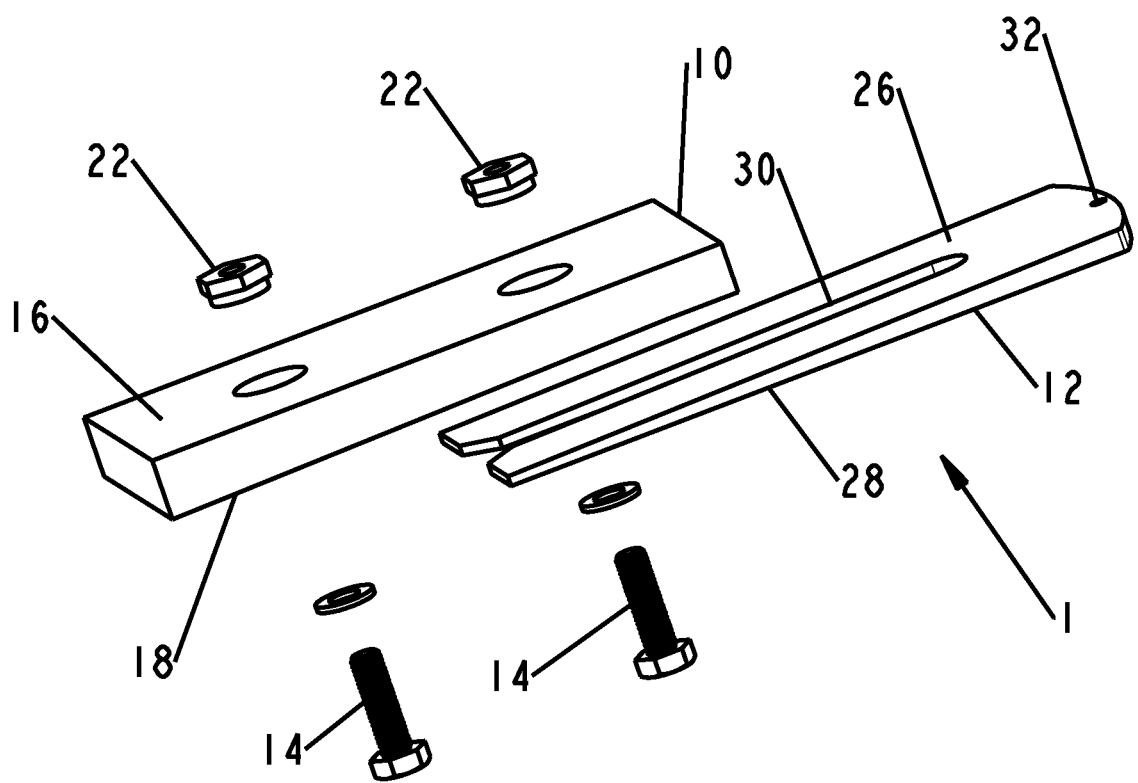
FIG. 1 is an exploded perspective view of a wear pad in accordance with the present invention.
Figure 2:
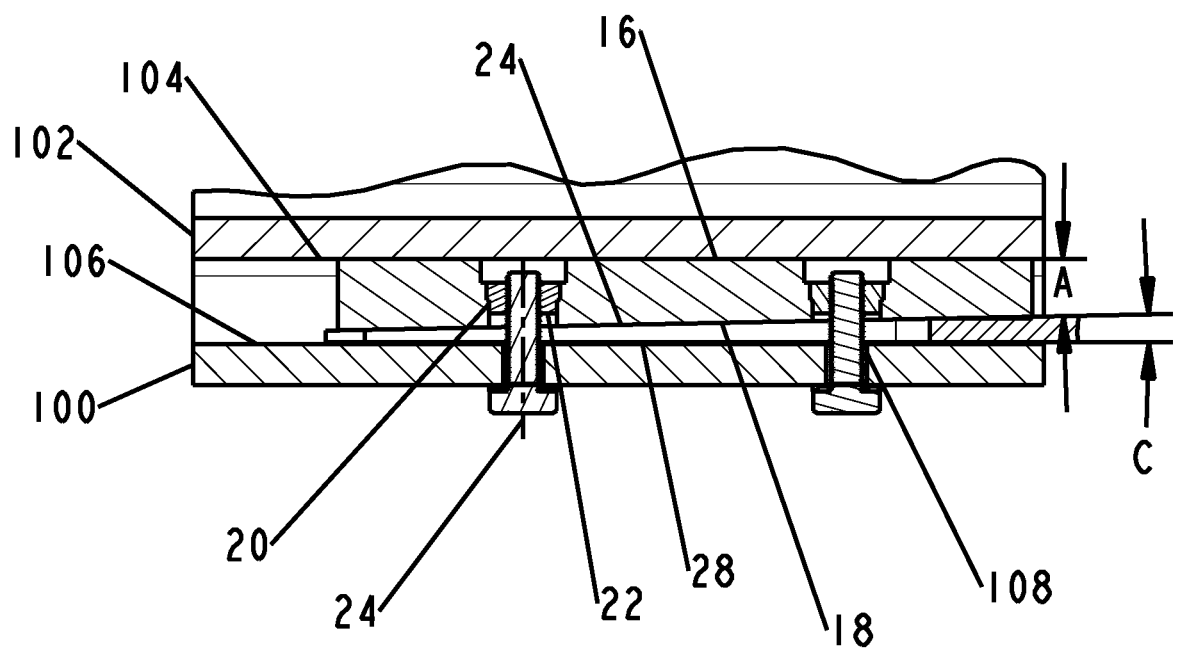
FIG. 2 is a cross sectional view of a wear pad secured to a stationary structure and with a moving structure object in contact with a wear surface of the wear pad in accordance with the present invention.
Figure 3:
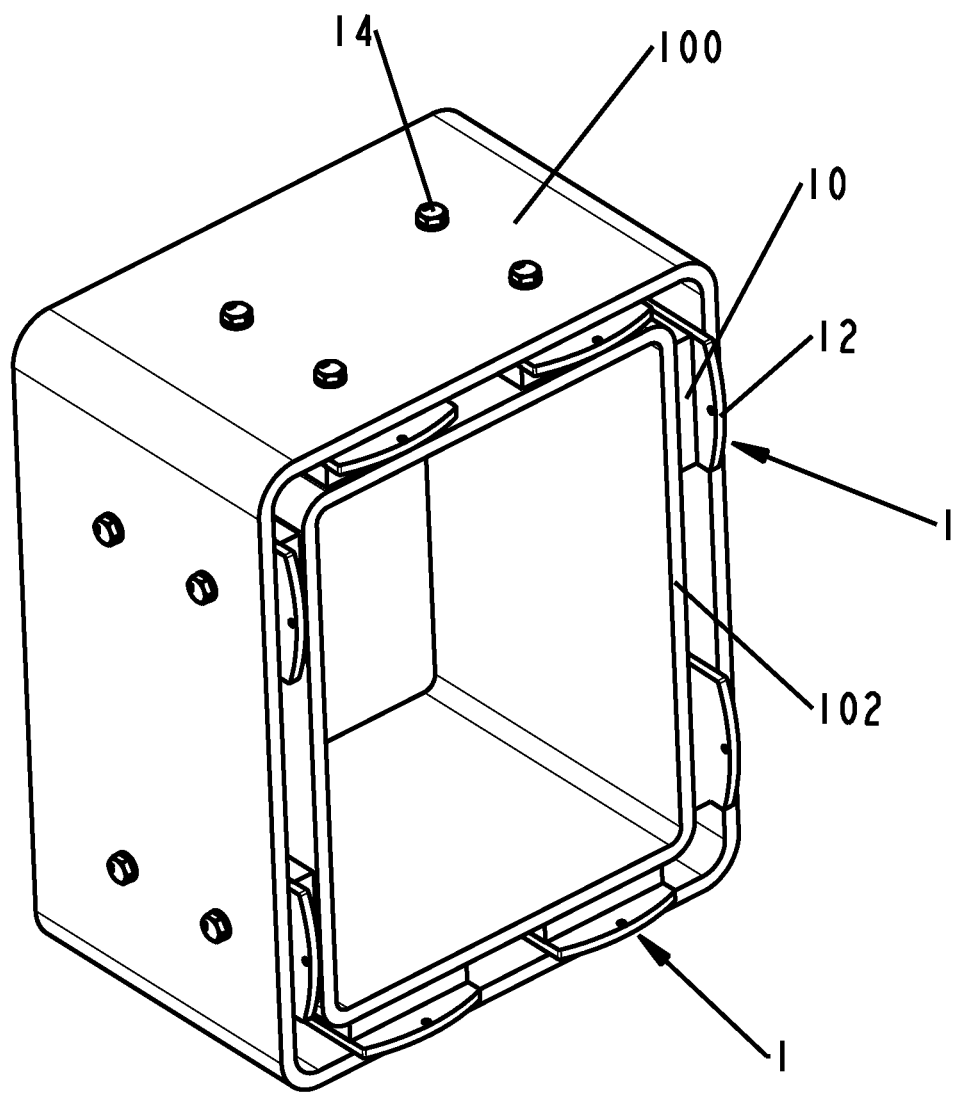
FIG. 3 is a perspective end view of eight wear pads mounted between a stationary structure and a moving structure in accordance with the present invention.

With reference now to the drawings, and particularly to FIG. 1, there is shown a wear pad 1. With reference to FIG. 2, the wear pad 1 preferably includes a wear pad 10, an adjustment plate 12 and at least one fastener 14. The wear pad 10 includes a wear surface 16 on a top and a wear tapered surface 18 on a bottom. The wear tapered surface 18 is defined by an acute angle "A" between the wear surface 16 and the wear tapered surface 18. The wear pad 10 includes at least one counter sunk cavity 20 for retaining a threaded insert 22 for threadably receiving the at least one fastener 14. An axis 24 of the at least one insert is perpendicular to the wear surface 16 of the wear pad 10. The adjustment plate 12 includes an adjustment tapered surface 26 on a top and a support surface 28 on a bottom. The adjustment tapered surface 26 forms an acute angle "C" with the support surface 28. The acute angle A of the wear tapered surface 18 is equal to the acute angle C of the adjustment tapered surface 26. It is preferable that the value of acute angles "A" and "C" are between 1-10 degrees. However, other values could also be used. The value of the acute "A" and "C" are dependent on the coefficient of friction between wear pad and adjustment plate. An adjustment slot 30 is formed through substantially all of a length of the adjustment plate 12. The length of the adjustment plate 12 is preferably longer than a length of the wear pad 10. The adjustment slot 30 provides clearance for the at least one fastener 14. It is preferable to form a manipulation hole 32 through an end of the adjustment plate 12 to receive a wire hook or the like.

The adjustment plate 12 will be mounted between the wear pad 10 and a mounting or stationary structure 100. The wear surface 16 of the wear pad 10 will make contact with an interfacing or moving surface 104 of a moving structure 102. The stationary structure 100 could be an outer tube of a telescoping crane boom and the moving structure 102 could be the inner tube of the telescoping crane boom. However, there are other suitable applications for the wear plate 1, besides crane booms. The support surface 28 of the adjustment plate 12 will make contact with a retention surface 106 of the stationary structure 100. At least one hole 108 is formed through the stationary structure 100 to insert the at least one fastener 14. The at least one fastener 14 is inserted through the at least one hole 108 and threaded into the at least one threaded insert 20 in the wear pad 10. When the wear tapered surface 18 is in contact with the adjustment tapered surface 26, the support surface 28 is parallel to the wear surface 16. The moving surface 104 will erode the wear surface 16 of the wear pad 10. When wear is detected, the at least one fastener 14 is loosened and an end of the adjustment plate 12 is slide toward an end of the wear pad 10 to raise the wear pad 10 and compensate for the erosion of the wear surface 16 by the moving surface 104. The at least one fastener 14 is torqued, such that the adjustment plate 12 does not move relative to the wear pad 10.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A wear pad system comprising:
a stationary structure;
a moving structure;
a wear pad includes a wear pad surface on a top and a wear pad tapered surface on a bottom, a wear pad acute angle exists between said wear pad surface and said wear pad tapered surface, at least one threaded insert is retained in said wear pad; and
an adjustment plate includes an adjustment plate tapered surface on a top and a support surface on a bottom, an adjustment plate acute angle exists between said support surface and said adjustment plate tapered surface, said wear pad is positioned and secured on the stationary structure using only at least one threaded fastener engaged with said at least one threaded insert.

2. The wear pad system of claim 1 wherein:
said wear pad acute angle is equal to said adjustment plate acute angle.

3. The wear pad system of claim 1 wherein:
a length of said adjustment plate is longer than a length of said wear pad.

4. The wear pad system of claim 1 wherein:
an axis of said threaded insert is perpendicular to said wear surface.

5. A wear pad system comprising:
a stationary structure;
a moving structure;
a wear pad includes a wear pad surface on a top and a wear pad tapered surface on a bottom, a wear pad acute angle exists between said wear pad surface and said wear pad tapered surface, at least one threaded insert is retained in said wear pad; and
an adjustment plate includes an adjustment plate tapered surface on a top and a support surface on a bottom, an adjustment plate acute angle exists between said support surface and said adjustment plate tapered surface, an adjustment slot is formed through substantially all of a length of said adjustment plate, said wear pad is positioned and secured on the stationary structure using only at least one threaded fastener engaged with said at least one threaded insert.

6. The wear pad system of claim 5 wherein:
said wear pad acute angle is equal to said adjustment plate acute angle.

7. The wear pad system of claim 5 wherein:
a length of said adjustment plate is longer than a length of said wear pad.

8. The wear pad system of claim 5 wherein:
an axis of said threaded insert is perpendicular to said wear surface.

9. The wear pad system of claim 5 wherein:
said adjustment slot provides clearance for said at least one threaded fastener.

10. A wear pad system comprising:
a stationary structure;
a moving structure;
a wear pad includes a wear pad surface on a top and a wear pad tapered surface on a bottom, a wear pad acute angle exists between said wear pad surface and said wear pad tapered surface, at least one threaded insert is retained in said wear pad; and
an adjustment plate includes an adjustment plate tapered surface on a top and a support surface on a bottom, an adjustment plate acute angle exists between said support surface and said adjustment plate tapered surface, said wear pad is positioned and secured on the stationary structure using only at least one threaded fastener insert through the stationary structure and engaged with said at least one threaded insert to retain said wear pad and adjustment plate, the moving structure contacts said wear pad.

11. The wear pad system of claim 10 wherein:
said wear pad acute angle is equal to said adjustment plate acute angle.

12. The wear pad system of claim 10 wherein:
a length of said adjustment plate is longer than a length of said wear pad.

13. The wear pad system of claim 10 wherein:
an axis of said threaded insert is perpendicular to said wear surface.

14. The wear pad system of claim 10 wherein:
an adjustment slot is formed through substantially all of a length of said adjustment plate.

* * * * *